US006653441B2

(12) United States Patent
Harre et al.

(10) Patent No.: US 6,653,441 B2
(45) Date of Patent: Nov. 25, 2003

(54) METHOD FOR PRODUCTION OF POLYETHER ALCOHOLS

(75) Inventors: Kathrin Harre, Dresden (DE); Gerd Höppner, Schwarzheide (DE); Georg Heinrich Grosch, Bad Dürkheim (DE); Stephan Bauer, Ostercappeln (DE); Jürgen Winkler, Schwarzheide (DE); Els Paredis, Ranst (BE); Reinhard Lorenz, Laer (DE); Inge Rotermund, Ortrand (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/130,846

(22) PCT Filed: Dec. 6, 2000

(86) PCT No.: PCT/EP00/12276

§ 371 (c)(1),
(2), (4) Date: May 21, 2002

(87) PCT Pub. No.: WO01/44347

PCT Pub. Date: Jun. 21, 2001

(65) Prior Publication Data

US 2002/0183482 A1 Dec. 5, 2002

(30) Foreign Application Priority Data

Dec. 14, 1999 (DE) .......................... 199 60 148

(51) Int. Cl.$^7$ .......................... C07C 43/11; C07C 41/03
(52) U.S. Cl. .......................... 528/419; 525/208; 528/45; 528/48; 528/66; 528/85; 568/624
(58) Field of Search .......................... 525/208; 528/45, 528/48, 66, 85, 419; 568/624

(56) References Cited

U.S. PATENT DOCUMENTS 5,792,829 A 8/1998 Allen et al. .................. 528/419

FOREIGN PATENT DOCUMENTS

| DE | 237178 | 7/1986 |
| DE | 275695 | 1/1990 |
| WO | WO 97/27236 | 7/1997 |

OTHER PUBLICATIONS

PCT International Search Report Dated Apr. 20, 2001.
Abstract of JP 2000–044505, Feb. 15, 2000.

*Primary Examiner*—Ba K. Trinh
(74) *Attorney, Agent, or Firm*—Fernando A. Borrego

(57) ABSTRACT

In a process for preparing polyether alcohols by catalytic addition of at least two alkylene oxides onto H-functional initiator substances, at least one multimetal cyanide compound is used as catalyst and the addition of the alkylene oxides onto the initiator substance includes incorporation of at least one oxyalkylene block during whose formation at least two alkylene oxides are metered in together and the ratio of the alkylene oxides to one another in the mixture is changed during the joint introduction.

13 Claims, No Drawings

METHOD FOR PRODUCTION OF POLYETHER ALCOHOLS

This application is a 371 of PCT/EP00/12276 filed Dec. 6, 2000.

The present invention relates to polyetherols, their preparation and their use for producing polyurethanes.

Polyether alcohols are used in large quantities for producing polyurethanes. They are usually prepared by catalytic addition of lower alkylene oxides, in particular ethylene oxide and propylene oxide, onto H-functional initiator substances. As catalysts, use is usually made of basic metal hydroxides or salts, with potassium hydroxide having the greatest industrial importance.

Many industrial application areas use polyether alcohols whose polyether chains are built up of more than one alkylene oxide. In the industry, use is usually made of lower alkylene oxides such as ethylene oxide, propylene oxide and butylene oxide, with ethylene oxide and propylene oxide having the greatest industrial importance. The molecular addition can be carried out by the block method, i.e. only one alkylene oxide is added on at a time. The polyether alcohols prepared in this way have polyether chains in which segments of one alkylene oxide are arranged in sequence. A further possible way of preparing polyether alcohols from at least two alkylene oxides is the random, also known as heteric, molecular addition of the alkylene oxides. Here, the alkylene oxides are metered into the reaction mixture in the form of a mixture. These mixtures usually contain the alkylene oxides in a constant ratio to one another. This method of introduction of the alkylene oxides will hereinafter be referred to as "classical random". The ratio referred to here is the quotient of the amounts of the alkylene oxides, with it being immaterial whether the "amount" is the weight or the molar amount, for example expressed in the unit "mol", of the alkylene oxides.

The known processes for preparing polyether alcohols have disadvantages which become particularly apparent when using catalysts having a high catalytic activity and result in the molecular addition of the alkylene oxides proceeding at a high rate. Thus, when multimetal cyanide catalysts, also known as DMC catalysts, are used to prepare polyether alcohols by molecular addition of a plurality of alkylene oxides, quality problems in respect of the polyether alcohols frequently occur. The blockwise molecular addition of the alkylene oxides frequently results in a very high molecular weight distribution and to turbidity in the polyether alcohol, while the random procedure frequently results in a content of ethylene oxide segments at the end of the chain which is too high for many applications. The addition of terminal ethylene oxide blocks onto propoxylates or blocks of random mixtures of alkylene oxides results in the formation of very high molecular weight ethoxylates which tie up a large proportion of the ethylene oxide fed in. These polyols have viscosities which are undesirably high for processing. This has the additional consequence that the content of ethylene oxide in the polyether alcohol has to be very high in order to achieve the high contents of terminal ethylene oxide desired for reactive polyols, as a result of which the hydrophilicity of the polyethers increases greatly. Even in the cases where processing of these polyethers to give polyurethane foam is possible, this results in formation of foams which are very susceptible to hydrolysis. A further problem often results from the fact that various organic or inorganic substances such as water, glycerol and catalysts, which are customary formulation constituents in the production of polyurethanes, have to be dissolved in the polyol during processing to give the polyol component which is then used in the urethane reaction. The type of blocks, block lengths and block distributions are therefore frequently subject to tight restrictions.

WO 97/27,236 (EP 876,416) describes a polyether alcohol for use in highly elastic flexible foams, which polyether alcohol comprises a propylene oxide inner block comprising not more than 35% by weight of the total amount of alkylene oxide and one or more external blocks of ethylene oxide and propylene oxide having an ethylene oxide content of at least 2% by weight, where the inner block is catalyzed at least partly and the external blocks are catalyzed completely by means of multimetal cyanide catalysts. However, such polyether alcohols are usually substantially more reactive than commercial, base-catalyzed polyether alcohols and can thus not be readily incorporated into known polyurethane systems. In addition, the polyether alcohols prepared in this way are usually turbid.

The problems indicated are particularly apparent in the case of polyurethane foams, in particular flexible foams, and are most distinct in the case of flexible slabstock foams. In particular, crack formation in the foam and a deterioration in the mechanical properties of the foams occur.

When using multimetal cyanide catalysts, high contents of terminal primary hydroxyl groups can be achieved by means of ethylene oxide end blocks only at the price of high hydrophilicity and extremely high viscosities.

DD-A-275 695 describes a process for preparing polyether alcohols in which ethylene oxide and propylene oxide are added on as a random mixture in which the ratio of the alkylene oxides rises or falls uniformly. However, owing to the low catalytic activity of the potassium hydroxide used as catalyst, the incorporation of the alkylene oxides into the polyether chain is not in the ratio in which they are fed in, but instead is changed by backmixing with previously introduced alkylene oxide which has not yet been added on. As a result, the desired block structures can be realized to only a limited extent and the properties of the polyether alcohols prepared in this way sometimes differ little from those of the polyether alcohols prepared by means of the classical random method. Although this deficiency could be alleviated by slower metering-in, this would lead to uneconomically long batch times. The use of catalysts which are not highly active, e.g. potassium hydroxide, leads to undesirable secondary reactions during the synthesis and these cause losses of alkylene oxide and also impair the product quality. Thus, iodine numbers of less than 0.4 cannot be achieved, which indicates a still considerable level of secondary reactions. The formation of unsaturated constituents in particular leads to a loss of hydroxyl functionality, as a result of which the amount of polyetherol required in the polyurethane reaction increases. In addition, formation of colored or odor-imparting by-products adversely affects the quality of the polyetherols prepared in this way.

In addition, the starting point and the end point of the metered introduction of alkylene oxides described in DD-A-275 695 has to be a pure alkylene oxide in each case. As a result, the random blocks described in DD-A-275 695 cannot always be advantageously combined with classical random blocks. Thus, polyols having intermediate contents of primary hydroxyl groups cannot be obtained. Furthermore, polyether alcohols which have been prepared by this procedure and commence with ethylene oxide always contain chain sections consisting of pure ethylene oxide. These lead to an undesirably high susceptibility to hydrolysis, to high viscosities and to susceptibility to turbidity of the polyether. If these random polyethers end with ethylene oxide, the backmixing effects become undesirably noticeable, so that some propylene oxide is always to be found at the end of the chain.

It is an object of the present invention to provide polyether alcohols which can be prepared by catalytic addition of at least two alkylene oxides onto H-functional initiator substances, which have no turbidity, which have viscosities favorable for processing and which can be processed without problems to give polyurethanes, in particular flexible polyurethane foams. In addition, the content of alkylene oxides at the end of the polyether chain should be able to be adjusted in a targeted way. High molecular weight tails, as occur in the molecular addition of alkylene oxides by a customary block procedure using DMC catalysts for preparing the polyether alcohols, should be avoided. In addition, long switching and pressure-stabilization phases, which are usually necessary between the individual blocks, should be avoided.

We have found that this object is achieved by a process for preparing polyether alcohols by means of catalytic addition of at least two alkylene oxides onto H-functional initiator substances, where at least one joint introduction of two alkylene oxides is carried out during the addition of the alkylene oxides onto the initiator substance and the ratio of the alkylene oxides in the mixture is changed during the course of the introduction.

This type of metered introduction of alkylene oxides will hereinafter be referred to as the dynamic procedure.

For the purposes of the present invention, the term "ratio" as described above is the quotient of the amounts of alkylene oxides metered in during the dynamic procedure.

The present invention accordingly provides a process for preparing polyether alcohols by catalytic addition of at least two alkylene oxides onto H-functional initiator substances, wherein at least one multimetal cyanide compound is used as catalyst and the addition of the alkylene oxides onto the initiator substance includes incorporation of at least one oxyalkylene block during whose formation at least two alkylene oxides are metered in together and the ratio of the alkylene oxides to one another in the mixture metered in is changed during the joint introduction.

The invention also provides the polyether alcohols prepared by said process, to their use for producing polyurethanes, in particular flexible polyurethane foams, and to the polyurethanes produced using the polyether alcohols.

The change in the ratio of the alkylene oxides can be linear or nonlinear. A linear change in the ratio of the alkylene oxides means that the ratio of the alkylene oxides changes by the same amount over any equal time interval. In this case, plotting the ratio of the alkylene oxides against time gives a straight line.

A nonlinear change in the ratio of the alkylene oxides means that the amount by which the ratio is changed over an equal time interval varies. In this case, plotting the ratio of the alkylene oxides against time gives a curve which is not a straight line. This curve may also be exponential.

The dynamic procedure may be configured so that the total amount of alkylene oxide metered in over a given time interval is constant during the entire dynamic procedure, but it is also possible to change the total amount of alkylene oxide metered in over a given time interval during the course of the dynamic procedure. This can be achieved, on the one hand, by keeping the amount of one alkylene oxide constant and changing the amount of the other alkylene oxide, or, on the other hand, changing the amounts of both alkylene oxides. In the latter case, the ratio of the alkylene oxides to one another has to change, as stated above.

The dynamic procedure can be carried out in such a way that the content of one of the alkylene oxides is continuously reduced during the procedure until a desired content of this alkylene oxide in the mixture has been reached or only the other alkylene oxide is still being introduced. It is also possible to carry out the dynamic procedure in such a way that the content of one of the alkylene oxides in the mixture is firstly increased continuously and then, immediately or after a phase with a constant ratio of alkylene oxides, is reduced continuously. At the beginning and at the end of the dynamic procedure, one or both alkylene oxides can in each case be present in the feed mixture.

In the simplest embodiment of the process of the present invention, the entire polyether chain is made up of a single block added on by means of the dynamic procedure.

However, preference is given to adding on only part of the polyether chain by the dynamic procedure and adding on the remaining alkylene oxide by the known block or random procedure. Here, one or more alkylene oxide blocks added on by the dynamic procedure can be incorporated in the polyether chain.

The alkylene oxide blocks which have been added on by the dynamic procedure can be located at the beginning, at the end or in the middle of the polyether chain.

When adding-on an alkylene oxide block by the dynamic procedure, it is possible to add at least one block consisting of only one alkylene oxide directly onto this block. This is preferably carried out by continuously reducing the content of the alkylene oxide which is not used for formation of the subsequent block in the feed mixture during the dynamic procedure until its content in the mixture is finally zero, and then continuing to meter in the other alkylene oxide alone. However, it is also possible for both alkylene oxides still to be present in the mixture at the end of the dynamic procedure and for the introduction of one of the alkylene oxides then to be stopped while continuing to meter in the other alkylene oxide.

It is also possible for at least one block comprising two alkylene oxides to be added by the classical random procedure directly onto the alkylene oxide block which has been added on by the dynamic procedure. Here, it is possible to carry out the dynamic procedure until the ratio of the alkylene oxides is that in which the subsequent random block is to be added on and then to continue to introduce the alkylene oxides in this ratio, or else to stop the dynamic metering and then to continue to meter in the alkylene oxides in the ratio in which they are to be added on in the subsequent block.

It is likewise possible to add on at least one block of only one alkylene oxide or two alkylene oxides in the classical random manner before the alkylene oxide block which is added on by the dynamic procedure. Here too, the ratio of the alkylene oxides at the end of this classical block can be identical to or different from the ratio of the alkylene oxides at the beginning of the dynamic procedure.

As indicated above, it is possible to add the block in the dynamic manner directly onto the initiator substance. This block can, as described above, contain one or both alkylene oxides at the beginning of the metered introduction and can be metered in by any of the above-described variants of the dynamic procedure. This can be followed by, as described, at least one pure alkylene oxide block or at least one alkylene oxide block added on by the classical random procedure. The polyether chain can also include at least one further alkylene oxide block which has been added on by the dynamic procedure.

Furthermore, an alkylene oxide block added on by the dynamic procedure can also be incorporated at the end of the chain. In the case of this block, too, all above-described embodiments of the dynamic procedure are possible. Thus, this block can contain one or both alkylene oxides at the beginning, and one or both alkylene oxides can then be metered in at the end of the metered introduction.

In the case of the alkylene oxide blocks which are added on by the random procedure and are located in the middle of the polyether chain, it is likewise possible to employ all the embodiments described. They can thus adjoin an alkylene oxide block comprising only one alkylene oxide or a classical random block having a composition identical to or different from that at the beginning of the dynamic procedure and at the beginning of the metered introduction contain only the alkylene oxide previously metered in alone or a mixture of the alkylene oxides used for introduction of the dynamic block. Likewise, only one or both alkylene oxides can be present at the end of the dynamic block. Afterwards, a pure alkylene oxide block or a classical random alkylene oxide block can likewise be added on, where this block can at its beginning have the same ratio or a different ratio of the alkylene oxides than that present at the end of the dynamic block.

Customary polyether alcohols for use in flexible molded urethane foam or in polyurethane elastomers usually have an inner block consisting of propylene oxide or a classical random mixture of ethylene oxide and propylene oxide. This is adjoined by a pure ethylene oxide block which is required to provide a high content of primary hydroxyl groups. When using multimetal cyanide catalysts, this procedure gives highly viscous, turbid polyethers having a low content of primary hydroxyl groups. Although the content of primary hydroxyl groups can be increased by molecular addition of relatively long ethylene oxide chains, this also results in an undesirably high increase in the hydrophilicity of the polyether alcohols. However, if a block having an increased ethylene oxide content at the end of the metered introduction is added on by the dynamic procedure at the end of the polyether chain starting from a classical random block or a block of only one alkylene oxide, the desired contents of primary hydroxyl groups can be obtained without long ethylene oxide blocks having to be added on at the end of the chain.

In contrast, when polyols are used in flexible slabstock foam, preference is given to using polyether alcohols having primary hydroxyl group contents of <10%. On the other hand, a certain ethylene oxide content should be present in the chain, since ethylene oxide in the polyether chain improves the solubility of water and various other additives required for polyurethane production in the polyol and, furthermore, is cheaper than propylene oxide. In addition, a certain ethylene oxide content in the outer polyether chain is useful for avoiding a closed-celled foam. However, in the classical random procedure, the ethylene oxide content cannot exceed certain limits since too much ethylene oxide at the end of the chain leads to an undesirably increased content of primary hydroxyl groups. However, if a mixture of alkylene oxides is added on by a dynamic procedure in which the content of ethylene oxide is reduced toward the end of the chain by reducing its content in the alkylene oxide mixture, high ethylene oxide contents can be incorporated into the chain without this resulting in the undesirable effect of the reactivity being increased by primary hydroxyl groups. An additional short block of pure propylene oxide at the end of the chain is also possible.

The process of the present invention is particularly advantageously carried out using multimetal cyanide catalysts, since these have a very high activity and therefore ensure that the alkylene oxide introduced is immediately incorporated into the chain.

These catalysts customarily have the formula (I)

$$M^1_a[M^2(CN)_b(A)_c]_d \cdot fM^1gX_n \cdot h(H_2O) \cdot eL \tag{I}$$

where $M^1$ is a metal ion selected from the group consisting of Zn2+, Fe2+, Co3+, Ni2+, Mn2+, Co2+, Sn2+, Pb2+, Mo4+, Mo6+, Al3+, V4+, V5+, Sr2+, W4+, W6+, Cr2+, Cr3+, Cd2+, $M^2$ is a metal ion selected from the group consisting of Fe2+, Fe3+, Co2+, Co3+, Mn2+, Mn3+, V4+, V5+, Cr2+, Cr3+, Rh3+, Ru2+, Ir3+ and $M^1$ and $M^2$ are identical or different,

A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, ureas, amides, nitriles and sulfides, and a, b, c, d, g and n are selected so that the compound is electrically neutral, and e is the coordination number of the ligand, a fraction or integer greater than or equal to 0 f is a fraction or integer greater than or equal to 0 and h is a fraction or integer greater than or equal to 0.

These compounds are prepared by generally known methods by combining the aqueous solution of a water-soluble metal salt with the aqueous solution of a hexacyanometalate, in particular a salt or an acid, and adding a water-soluble ligand while the solutions are being combined or afterwards.

The catalyst is usually used in an amount of less than 1% by weight, preferably in an amount of less than 0.5% by weight, particularly preferably in an amount of less than 1000 ppm and in particular in an amount of less than 500 ppm, in each case based on the weight of the polyether alcohol.

Alkylene oxides which can be used for the process of the present invention are ethylene oxide, 1,2-epoxypropane (propylene oxide), 1,2-methyl-2-ethoxypropane, 1,2-epoxybutane, 2,3-epoxybutane (butylene oxide), 1,2-methyl-3-ethoxybutane, 1,2-epoxypentane, 1,2-methyl-3-ethoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, (2,3-epoxypropyl)benzene, vinyloxirane, 3-phenoxy-1,2-epoxypropane, 2,3-epoxy(methyl ether), 2,3-epoxy(ethyl ether), 2,3-epoxy(isopropyl ether), 2,3-epoxy-1-propanol, (3,4-epoxybutyl stearate, 4,5-epoxypentyl acetate, 2,3-epoxypropyl methacrylate, 2,3-epoxypropyl acrylate, glycidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)propene oxide, 3-(perfluoroethyl)propene oxide, 3-(perfluorobutyl)propene oxide, 4-(2,3-epoxypropyl)morpholine or 1-(oxiran-2-ylmethyl)pyrrolidin-2-one.

Preference is given to using ethylene oxide, propylene oxide and butylene oxide, particularly preferably ethylene oxide and propylene oxide.

H-functional initiator substances used are, in particular, 2- to 8-functional alcohols. To prepare polyether alcohols for use in flexible polyurethane foams, which can be prepared particularly advantageously by the process of the present invention, particularly useful initiator substances are bifunctional and trifunctional alcohols, for example, ethylene glycol, diethylene glycol, triethylene glycol, propylene glycol, dipropylene glycol, tripropylene glycol, glycerol, trimethylolpropane or pentaerythritol. The alcohols mentioned can be used individually or in any mixtures with one another.

To carry out the process of the present invention, the initiator substance is placed in a reaction vessel at the beginning of the reaction and, if necessary, water and other volatile compounds are removed. This is usually carried out by distillation, preferably under reduced pressure or using vacuum stripping with carrier gases. The catalyst can already be present in the initiator substance, but it is also possible to add the catalyst only after the pretreatment of the initiator substance. In the latter variant, the catalyst is subjected to less thermal stress. Before the alkylene oxides are introduced, it is customary to make the reactor inert in order to avoid undesirable reactions of the alkylene oxides with oxygen. The alkylene oxides are then metered in, with the molecular addition being carried out in the manner described above. The molecular addition of the alkylene oxides is usually carried out at pressures in the range from 0.01 bar to 10 bar and temperatures in the range from 50 to 200° C., preferably from 90 to 150° C.

The reaction can be carried out continuously or batchwise. After the reaction is complete, the unreacted monomers and volatile compounds are removed from the reaction mixture, usually by means of distillation. When using DMC catalysts, the catalyst can in principle remain in the polyether alcohol, but it can also be removed, for example by treating the polyether alcohol with oxidizing agents and separating off the insoluble compounds formed.

As mentioned, the polyether alcohols prepared by the process of the present invention can advantageously be used for producing polyurethanes, in particular for producing flexible polyurethane foams. The polyurethanes are produced according to methods known per se by reacting the polyether alcohols of the present invention, if desired in admixture with other compounds having at least two hydrogen atoms which are reactive toward isocyanate groups, with polyisocyanates. This reaction is preferably carried out in the presence of the customary catalysts, blowing agents and auxiliaries and additives. The polyether alcohols prepared by the process of the present invention can be used individually or in admixture with other H-functional compounds.

Polyisocyanates used here are all isocyanates having two or more isocyanate groups in the molecule. It is possible to use either aliphatic isocyanates such as hexamethylene diisocyanate (HDI) or isophorone diisocyanate (IPDI), or preferably aromatic isocyanates such as tolylene diisocyanate (TDI), diphenylmethane diisocyanate (MDI) or mixtures of diphenylmethane diisocyanate and polymethylenepolyphenylene polyisocyanates (crude MDI). It is also possible to use isocyanates which have been modified by incorporation of urethane, uretdione, isocyanurate, allophanate, uretonimine and other groups, known as modified isocyanates.

As compounds which contain at least two isocyanate-reactive groups and which can be used in admixture with the polyether alcohols of the present invention, it is possible to use amines, mercaptans and preferably polyols. Among the polyols, polyether polyols and polyester polyols have the greatest industrial importance. The polyether polyols used for producing polyurethanes are usually prepared by base-catalyzed addition of alkylene oxides, in particular ethylene oxide and/or propylene oxide, onto H-functional initiator substances. Polyester polyols are usually prepared by esterification of polyfunctional carboxylic acids with polyfunctional alcohols.

The compounds containing at least two groups which are reactive toward isocyanate groups also include the chain extenders and/or crosslinkers which can be used if desired. These are at least bifunctional amines and/or alcohols having molecular weights in the range from 60 to 400.

As blowing agent, use is usually made of water and/or compounds which are inert toward the starting materials for the polyurethanes and are gaseous at the reaction temperature of the urethane reaction, known as physically acting blowing agents, and also mixtures thereof. Physically acting blowing agents used are hydrocarbons having from 2 to 6 carbon atoms, halogenated hydrocarbons having from 2 to 6 carbon atoms, ketones, acetals, ethers and inert gases such as carbon dioxide and/or noble gases.

Catalysts used are, in particular, amine compounds and/or metal compounds, in particular heavy metal salts and/or organometallic compounds. In particular, tertiary amines and/or organic metal compounds are used as catalysts.

Examples of auxiliaries and/or additives which may be used are mold release agents, flame retardants, colorants, fillers and/or reinforcing materials.

It is customary in industry to mix all starting materials with the exception of the polyisocyanates to form a polyol component and to react this with the polyisocyanates to give the polyurethane.

The polyurethanes can be produced by the one-shot method or by the prepolymer method. The flexible polyurethane foams can be either slabstock foams or molded foams.

An overview of the starting materials for the production of polyurethanes and the processes employed for this purpose may be found, for example, in Kunststoffhandbuch, Volume 7 "Polyurethane", Carl-Hanser-Verlag, Munich, Vienna, 1st Edition 1966, 2nd Edition 1983 and 3rd Edition 1993.

The polyether alcohols of the present invention have a very narrow molecular weight distribution and surprisingly display no turbidity. Owing to the very high reaction rate in the molecular addition of the alkylene oxides by means of DMC catalysts, controlled addition of the alkylene oxides onto the initiator substance is possible. The dynamic procedure can reduce the overall number of blocks requiring a change of alkylene oxide or of the ratio of the alkylene oxides at the end of the block in a subsequent classical random procedure. This results in a time advantage in the preparation, since the metering pause and stabilization phase usually required between the blocks due to the change of alkylene oxides metered in becomes unnecessary.

The invention is illustrated by the following examples.

EXAMPLE 1

1000 ml of strong acid ion exchanger (K2431, Bayer) were regenerated twice using 450 g of HCl (37% HCl content) and then washed with water until the eluate was neutral. A solution of 80.8 g of $K_3[Co(CN)_6]$ in 250 ml of water was then introduced onto the ion exchange column. The column was then eluted until the eluate was neutral again. The Co:K ratio in the eluate obtained was greater than 10:1. The 1269 g of eluate were heated to 40° C. and subsequently admixed while stirring with a solution of 80.0 g of zinc(II) acetate dihydrate in 240 g of water. 276.4 g of tert-butanol were subsequently added to the suspension and the suspension was stirred for another 30 minutes at 40° C. The solid was then filtered off with suction and washed on the filter with 300 ml of tert-butanol. The solid which had been treated in this way was dried at room temperature.

EXAMPLE 2

A solution of 400 g of $K_3[Co(CN)_6]$ in 1300 ml of water was introduced onto a column containing 5000 ml of freshly regenerated, strong acid ion exchanger (K2431, Bayer). The column was then eluted until the eluate was neutral again. The Co:K ratio in the eluate obtained was greater than 10:1. 5000 g of eluate were heated to 40° C. and subsequently admixed while stirring (screw stirrer, 500 rpm) with a solution of 396 g of zinc(II) acetate dihydrate in 1400 g of water. 1400 g of tert-butanol were subsequently added to the suspension and the suspension was stirred for another 30 minutes at 40° C. The solid was then filtered off with suction, then slurried with 4000 ml of tert-butanol and filtered off again. The solid which had been treated in this way was dried at 50° C. and 25 mbar.

EXAMPLE 3

7 l of strong acid ion exchanger in the sodium form (Amberlite 252 Na, Rohm&Haas) were placed in an ion exchange column (length: 1 m, volume: 7.7 l). The ion exchanger was subsequently converted into the H form by passing 10% strength hydrochloric acid through the ion exchange column at a rate of 2 bed volumes per hour for 9 hours, until the Na content of the outflowing acid was less than 1 ppm. The ion exchanger was subsequently washed with water until neutral.

The regenerated ion exchanger was then used to prepare an essentially alkali-free hexacyanocobaltic acid. For this purpose, a 0.24 molar solution of potassium hexacyanocobaltate in water was passed through the ion exchanger at a rate of 1 bed volume per hour. After 2.5 bed volumes, the potassium hexacyanocobaltate solution was replaced by water. The 2.5 bed volumes obtained had an average hexacyanocobaltic acid content of 4.5% by weight and alkali metal contents of less than 1 ppm.

The hexacyanocobaltic acid solution used below was diluted appropriately with water.

2432.9 g of aqueous hexacyanocobaltic acid solution (cobalt content: 6 g/l) were heated to 40° C. and, while stirring (blade stirrer, 500 rpm), 120 ml of the surfactant Pluronic® PE 6100 (BASF Aktiengesellschaft, block copolymer of propylene oxide and ethylene oxide) were added and dissolved. A solution of 108.8 g of zinc(II) acetate dihydrate in 400 g of water was subsequently added while stirring (blade stirrer, 500 rpm). 400 g of tert-butanol were subsequently added to the suspension. The suspension was stirred at 40° C. for another 30 minutes, after which the solid was filtered off with suction. The moist filter cake (330 g) was dispersed in 2000 ml of water for 5 minutes by means of an Ultraturrax.

EXAMPLE 4: (COMPARISON)

The synthesis was carried out in a cleaned and dried 1 l stirring autoclave. 80 g of propoxylated glycerol having a molecular weight of 400 g/mol were introduced into the autoclave and admixed with 250 ppm of the catalyst from Example 3. The contents of the reactor were made inert using nitrogen and vacuum-treated for a total of 1 hour at 125° C. At 115° C., 820 g of a mixture of 68% by weight of propylene oxide and 32% by weight of ethylene oxide were metered in over a period of 1 hour. The reaction mixture was stirred for a further 15 minutes and degassed at 105° C. and 8 mbar. The product was worked up by filtration. The polyol was turbid.

Hydroxyl number: 33.9 mg KOH/g;
viscosity at 25° C.: 4966 mPas;
content of primary hydroxyl groups: 23%;
$M_w$: 15,990 g/mol
D: 2.98 (polydispersity, quotient of $M_w$ and $M_n$)

EXAMPLE 5: (COMPARISON)

The synthesis was carried out in a cleaned and dried 1 l stirring autoclave. 80 g of propoxylated glycerol having a molecular weight of 400 g/mol were introduced into the autoclave and admixed with 250 ppm of the catalyst from Example 3. The contents of the reactor were made inert using nitrogen and vacuum-treated for a total of 1 hour at 125° C. At 115° C., 560 g of propylene oxide were metered in over a period of 45 minutes and subsequently 260 g of ethylene oxide were metered in over a period of 45 minutes. The reaction mixture was stirred for a further 15 minutes and degassed at 105° C. and 10 mbar. The product was worked up by filtration. The polyol was white and viscous.
Hydroxyl number: 37.4 mg KOH/g;
viscosity at 25° C.: 1482 mPas;
content of primary hydroxyl groups: 27%;
$M_w$: not able to be determined, since the sample was insoluble

EXAMPLE 6

The synthesis was carried out in a cleaned and dried 10 l stirring autoclave. 424.8 g of propoxylated glycerol having a molecular weight of 400 g/mol were placed in the autoclave and admixed with 1.505 g of the catalyst from Example 3 (250 ppm based on the solids content). The contents of the reactor were made inert using nitrogen and vacuum-treated for a total of 1.5 hours at 110° C. At 125° C., 3.5 bar of nitrogen were injected and a total of 3853.5 g of propylene oxide and 571.1 g of ethylene oxide were subsequently metered in over a period of 3 hours. The ethylene oxide content of the mixture remained at 12.8% until 87.5% of the toal amount of alkylene oxide had been metered in and was then reduced linearly to 0%. The product was worked up by filtration. The polyol was clear.
Hydroxyl number: 35.0 mg KOH/g;
viscosity at 25° C.: 845 mPas;
content of primary hydroxyl groups: 5.3%;
$M_w$: 4107 g/mol;
D: 1.13

EXAMPLE 7

The synthesis was carried out in a cleaned and dried 10 l stirring autoclave. 423.4 g of propoxylated glycerol having a molecular weight of 400 g/mol were placed in the autoclave and admixed with 1.50 g of the catalyst from Example 2 (312 ppm based on the solids content). The contents of the reactor were made inert using nitrogen and vacuum-treated for a total of 1.5 hours at 110° C. At 125° C., 3.5 bar of nitrogen were injected and a total of 3819.2 g of propylene oxide were metered in over a period of 3 hours and 566.0 g of ethylene oxide were subsequently metered in over a period of 2 hours 43 minutes 52 seconds. The metering rate for the propylene oxide was increased continuously and linearly over a period of 60 minutes from 0 g/h to 1465.1 g/h, kept constant for 1 hour 7 minutes 52 seconds and increased continuously and linearly to 1759 g/h over a period of 36 minutes and subsequently kept constant for 16 minutes 8 seconds.

Simultaneously with the commencement of the introduction of the propylene oxide, the metering rate of the ethylene oxide was increased from 0 to 293.2 g/h over a period of 60 minutes, kept constant for 1 hour 7 minutes and 52 seconds and then reduced continuously and linearly to 0 g/h over a period of 36 minutes. The initial pressure was 3576 mbar, and the final pressure was 7067 mbar. The mixture was stirred for another 25 minutes and subsequently degassed for 20 minutes at 105° C. and 6 mbar. The product was worked up by filtration. The polyol was clear.
Hydroxyl number: 35.1 mg KOH/g;
viscosity at 25° C.: 817 mPas;
content of primary hydroxyl groups: 4.3%;
$M_w$: 4111 g/mol;
D: 1.1

EXAMPLE 8: (COMPARISON)

The synthesis was carried out in a cleaned and dried 1 l stirring autoclave. 80 g of propoxylated glycerol having a molecular weight of 400 g/mol were placed in the autoclave and admixed with 250 ppm of the catalyst from Example 3. The contents of the reactor were made inert using nitrogen and vacuum-treated for a total of 1 hour at 125° C. At 115° C., firstly 650 g of propylene oxide, subsequently 118 g of ethylene oxide and then 98 g of propylene oxide were metered in. The reaction mixture was stirred for a further 15 minutes and degassed at 105° C. and 6 mbar. The product was worked up by filtration. The polyol was turbid and so highly viscous that a viscosity measurement at 25° C. was not possible.
Hydroxyl number: 35.4 mg KOH/g;
viscosity at 75° C.: 95.8 mPas;
content of primary hydroxyl groups: 7%;
D: 1.24

EXAMPLE 9: (COMPARISON)

The synthesis was carried out in a cleaned and dried 1 l stirring autoclave. 80 g of propoxylated glycerol having a molecular weight of 400 g/mol were placed in the autoclave and admixed with 250 ppm of the catalyst from Example 3. The contents of the reactor were made inert using nitrogen and vacuum-treated for a total of 1 hour at 125° C. At 115° C., firstly a mixture of 651 g of propylene oxide and 118 g of ethylene oxide and then 98 g of propylene oxide were metered in. The reaction mixture was stirred for another 15 minutes and degassed at 105° C. and 6 mbar. The product was worked up by filtration. The polyol was turbid.
Hydroxyl number: 36.2 mg KOH/g;
viscosity at 25° C.: 719 mPas;
content of primary hydroxyl groups: 6%;
D: 1.23

EXAMPLE 10

The synthesis was carried out in a cleaned and dried 10 l stirring autoclave. 424.8 g of propoxylated glycerol having a molecular weight of 400 g/mol were placed in the autoclave and admixed with 1.505 g of the catalyst from Example 2 (312 ppm based on the solids content). The contents of the reactor were made inert using nitrogen and vacuum-treated for a total of 1 hour at 110° C. At 125° C., 3.5 bar of nitrogen were injected and, subsequently, a total of 3853.5 g of propylene oxide were metered in over a period of 3 hours and, commencing 1 hour after the commencement of the introduction of the propylene oxide, 571.1 g of ethylene oxide were metered in over a period of 2 hours. The metering rate of the propylene oxide was increased continuously and linearly from 0 g/h to 1759.9 g/h over a period of 60 minutes, then reduced to 352.0 g/h over a period of 2 hours. 1 hour after the commencement of the introduction of the propylene oxide, the metering rate of the ethylene oxide was increased from 0 to 352.0 g/h over a period of 2 hours. The initial pressure was 3525 mbar, and the final pressure was 7280 mbar. The reaction mixture was stirred for another 30 minutes and subsequently degassed for 35 minutes at 105° C. and 10 mbar. The product was worked up by filtration. The polyol was clear.
Hydroxyl number: 35.8 mg KOH/g; $V_{25}$:767 mPas;
content of primary hydroxyl groups: 46%;
$M_w$: 3890 g/mol;
D: 1.1

EXAMPLE 11: (COMPARISON)

The synthesis was carried out in a cleaned and dried 1 l stirring autoclave. 80 g of propoxylated glycerol having a molecular weight of 400 g/mol were placed in the autoclave and admixed with 250 ppm of the catalyst from Example 3. The contents of the reactor were made inert using nitrogen and vacuum-treated for a total of 1 hour at 125° C. At 115° C., firstly 749 g of propylene oxide and subsequently 118 g of ethylene oxide were metered in. The reaction mixture was stirred for a further 15 minutes and degassed at 105° C. and 9 mbar. The product was worked up by filtration. The polyol was turbid.
Hydroxyl number: 34.8 mg KOH/g;
viscosity at 75° C.: 95.9 mPas;
content of primary hydroxyl groups: 11%;
D: 1.27

EXAMPLE 12: (COMPARISON)

The synthesis was carried out in a cleaned and dried 1 l stirring autoclave. 80 g of propoxylated glycerol having a molecular weight of 400 g/mol were placed in the autoclave and admixed with 250 ppm of the catalyst from Example 3. The contents of the reactor were made inert using nitrogen and vacuum-treated for a total of 1 hour at 125° C. At 115° C., a mixture of 749 g of propylene oxide and 118 g of ethylene oxide was metered in. The reaction mixture was stirred for a further 15 minutes and degassed at 105° C. and 6 mbar. The product was worked up by filtration. The polyol was turbid.
Hydroxyl number: 35.5 mg KOH/g;
viscosity at 25° C.: 919 mPas;
content of primary hydroxyl groups: 10%;
D: 1.34

The content of primary hydroxyl groups was determined by reaching the hydroxyl groups with trichlotoacetyl isocyanate and recording the H-NMR spectrum of the polyether alcohol treated in this way. In the spectrum, the reached primary and secondary hydroxyl groups display different peaks.

We claim:

1. A process for preparing polyether alcohols by catalytic addition of at least two alkylene oxides onto H-functional initiator substances, wherein at least one multimetal cyanide compound is used as catalyst and the addition of the alkylene oxides onto the initiator substance includes incorporation of at least one oxyalkylene block during whose formation at least two alkylene oxides are metered in together and the ratio of the alkylene oxides to one another in the mixture is changed during the joint introduction.

2. A process as claimed in claim 1, wherein the oxyalkylene block during whose formation the ratio of the alkylene oxides to one another in the mixture is changed during the joint introduction consists of two alkylene oxides.

3. A process as claimed in claim 1 or 2, wherein the ratio of the alkylene oxides to one another in the mixture is changed linearly.

4. A process as claimed in claim 1, wherein the ratio of the alkylene oxides to one another in the mixture is changed nonlinearly.

5. A process as claimed in claim 1, wherein the oxyalkylene block during whose formation at least two alkylene oxides are metered in together and the ratio of the alkylene oxides to one another in the mixture is changed during the joint introduction encompasses the entire polyether chain.

6. A process as claimed in claim 1, wherein the oxyalkylene block during whose formation at least two alkylene oxides are metered in together and the ratio of the alkylene oxides to one another in the mixture is changed during the joint introduction is incorporated at the beginning of the polyether chain.

7. A process as claimed in claim 1, wherein the oxyalkylene block during whose formation at least two alkylene oxides are metered in together and the ratio of the alkylene oxides to one another in the mixture is changed during the joint introduction is incorporated at the end of the polyether chain.

8. A process as claimed in claim 1, wherein the oxyalkylene block during whose formation at least two alkylene oxides are metered in together and the ratio of the alkylene oxides to one another in the mixture is changed during the joint introduction is incorporated in the middle of the polyether chain.

9. A process as claimed in claim 1, wherein at least one block made up of only alkylene oxide or a mixture of at least two alkylene oxides whose molar ratio to one another is not changed is incorporated before and/or after the oxyalkylene block during whose formation at least two alkylene oxides are metered in together and the ratio of the alkylene oxides to one another in the mixture is changed during the joint introduction.

10. A process as claimed in claim 1, wherein the alkylene oxides used to form the oxyalkylene block during whose formation at least two alkylene oxides are metered in together and the ratio of the alkylene oxides to one another in the mixture is changed during the joint introduction are ethylene oxide and propylene oxide.

11. A process as claimed in claim 1, wherein the catalysts used for the molecular addition of the alkylene oxides are multimetal cyanide compounds.

12. A polyether alcohol prepared in accordance with the process in claim 1.

13. A process for producing polyurethanes by reacting polyisocyanates with compounds having at least two hydrogen atoms which are reactive toward isocyanate groups, wherein polyether alcohols as claimed in claim 12 are used as the compounds having at least two hydrogen atoms.

* * * * *